United States Patent
Price

(10) Patent No.: US 6,525,542 B2
(45) Date of Patent: Feb. 25, 2003

(54) APPARATUS FOR MONITORING THE STATUS OF DEVICES IN ELECTRICAL PROTECTION AND CONTROL SYSTEMS

(75) Inventor: Richard Thomas Price, Stafford (GB)

(73) Assignee: Alston, Paris (FR)

( * ) Notice: Subject to any disclaimer, the term of this patent is extended or adjusted under 35 U.S.C. 154(b) by 15 days.

(21) Appl. No.: 09/772,564

(22) Filed: Jan. 30, 2001

(65) Prior Publication Data

US 2001/0026159 A1 Oct. 4, 2001

(30) Foreign Application Priority Data

Feb. 1, 2000 (GB) .............................................. 0002140

(51) Int. Cl.⁷ .............................................. G01R 31/14
(52) U.S. Cl. ..................................... 324/509; 324/76.41
(58) Field of Search ................................. 324/509, 508, 324/76.11–76.83, 418, 76.41

(56) References Cited

U.S. PATENT DOCUMENTS

| 4,459,651 A | * | 7/1984 | Fenter | 363/21.15 |
| 4,560,886 A | * | 12/1985 | Ferguson | 307/48 |
| 4,672,300 A | * | 6/1987 | Harper | 323/222 |
| 4,695,936 A | * | 9/1987 | Whittle | 363/21.1 |
| 4,887,199 A | * | 12/1989 | Whittle | 363/21.1 |
| 5,063,527 A | * | 11/1991 | Price et al. | 431/24 |
| 5,202,725 A | * | 4/1993 | Oku | 307/29 |
| 6,134,122 A | * | 10/2000 | Chen et al. | 307/58 |
| 6,301,135 B1 | * | 10/2001 | Mammano et al. | 363/132 |

FOREIGN PATENT DOCUMENTS

GB  2 192 298 A  1/1988

* cited by examiner

*Primary Examiner*—Christine Oda
*Assistant Examiner*—John Teresinski
(74) *Attorney, Agent, or Firm*—Kirschstein, et al.

(57) ABSTRACT

A protection and control system incorporates status acquisition apparatus for use in monitoring the status of a device in the protection and control system, such as a protection relay in a high voltage electrical circuit. The status acquisition apparatus comprises a conversion circuit which converts an input voltage to a pulse width modulated signal and a comparison circuit which monitors the pulse width modulated signal to determine the status of the device. The mark-space ratio of the pulse width modulated signal decreases as the input voltage is increased to minimize power dissipation over a range of input voltages. The status acquisition apparatus may form an integral part of a protective switching device, although other applications are envisaged.

23 Claims, 3 Drawing Sheets

APPARATUS FOR MONITORING THE STATUS OF DEVICES IN ELECTRICAL PROTECTION AND CONTROL SYSTEMS

FIELD OF THE INVENTION

This invention relates to improvements in protection and control systems for use in power generation, transmission and distribution, and in particular to an improved design of status acquisition apparatus for monitoring the status of devices forming part of such systems, e.g., relays, circuit breakers, interrupters, isolators and similar protective switching devices.

BACKGROUND OF THE INVENTION

It is well known, for example, that a protective relay includes appropriate circuitry that monitors the condition of a power system circuit in order to decide when to trip the circuit breaker of that circuit. The output contact of the protective relay can either be used for driving the trip coil of the circuit breaker directly, or can be used to signal another protective relay, via a status acquisition apparatus associated with that relay, that it has detected an event. The circuit connecting the output contacts of the protective relay (or any other external apparatus) to the status acquisition apparatus of another protective relay is known as a status circuit. The status circuits require an external power supply for them to operate.

The protection relay circuitry is driven by a power supply that is independent of the electrical circuit that is being protected. In many cases the protection relays will be powered from an independent battery supply. This is usually 24/27V, 30/34V, 48/54V, 110/125V or 220/250 volts depending on the type of installation. This supply will also be used to power the status circuits. More than one battery voltage may be present in any given installation.

Protective relays are usually housed in non-ventilated enclosures to improve reliability. Low power dissipation of any electrical circuitry provided in the enclosure is therefore essential.

A protective relay will typically incorporate status acquisition apparatus which allows interaction between a number of protective relays and other associated external apparatus. The status acquisition apparatus may be an integral part of the protection relay circuitry located within the non-ventilated enclosure.

The signals fed into the status acquisition apparatus will be used by the protective relay, in conjunction with data obtained from its own monitoring circuitry, to determine when to initiate a trip via its output contacts. The status acquisition apparatus has two defined states: One state indicates 'valid signal' where the voltage present at its input is above a defined threshold and the other indicates 'no signal' where no voltage or a voltage less than the threshold is present.

Of course, a status acquisition apparatus may be adapted to monitor the status of the output of other devices as well as or instead of relays. They may be incorporated in a variety of systems for control or monitoring or any other application where fault monitoring or general status monitoring is needed.

The status acquisition apparatus design must meet several criteria. It must tolerate noise on the battery voltage without producing a false signal yet provide a rapid response if a true signal is detected. It must consume a minimum amount of power if it is located within a sealed housing and ideally be easily reconfigured to operate with different battery voltages.

Several prior-art status acquisition apparatus designs have been developed which can cope with a range of different supply voltage ratings. In one arrangement it is known to provide a constant current circuit which is fed from the battery voltage. The circuit draws a constant current from the battery supply that is used to drive an opto-isolator. The opto-isolator produces a 'valid signal' output as long as the current drawn exceeds the turn-on threshold of the opto-isolator. This depends on the current transfer ratio of the opto-isolator. If the battery voltage is not present or drops too low then the circuit cannot draw current, the opto-isolator produces no output, indicating that no signal is present.

A problem with the use of the constant current circuit is that the circuit will consume more power at a higher supply voltage than at lower supply voltage (since power=current multiplied by voltage). Thus, a constant current based circuit that is sufficiently sensitive to operate at the lowest expected battery voltage (say 24/27 volts) will have excessive power dissipation at the largest expected input voltage (say 220/250 volts).

In an alternative design, it has been proposed periodically to sample the input voltage for a fixed period. Current is able to flow through the opto-isolator for the duration of the sampling interval. Appropriately valued linear components, such as resistors and capacitors, are used in the circuit to set the current level. By getting a customer to specify the battery voltage of their system, a variant of the circuit using the most suitable linear components can be offered to meet their requirements. In this way power drawn is kept to a minimum. Unfortunately, this limits the use of the circuit to specific supply voltages, and if the incorrect variant of the circuit is used then it may be damaged.

It is an object of the present invention to overcome at least partially the disadvantages present in prior art systems.

SUMMARY OF THE INVENTION

In accordance with a first aspect the invention provides a protection and control system for use in power generation, transmission and distribution, the system including status acquisition apparatus for monitoring the status of at least one device in the system. The apparatus comprises:

conversion means adapted to receive an input signal representative of the status of the device and convert the input signal into a pulse width modulated signal, the mark-space ratio of the pulse width modulated signal decreasing with the magnitude of the input signal; and comparison means adapted to compare the mark-space ratio of the pulse width modulated signal with a reference value and produce a status indication signal in the event that the result of the comparison meets a predetermined criterion.

The invention thus provides apparatus in which the input signal is converted to a pulse width modulated waveform which changes in mark-space ratio as the input voltage increases. By making the mark-space ratio decrease for increases in the magnitude of the input signal, such as an increasing input voltage, it is possible to ensure that at low voltages the power dissipated is similar to that dissipated at high voltages.

The pulse width modulated signal may comprise a single on-period (mark) and a single off-period (space) within each cycle. Of course, other pulse width modulated waveforms are envisaged.

The device that produces the status signal may comprise any device, apparatus or circuit from which a signal indicative of an event such as the status of a switch or of a voltage level can be obtained. This may in one application comprise a protection relay with the status signal comprising a signal representative of the switching state of the relay. The status signal may therefore be indicative of the status of the relay contact, i.e., open or closed.

Alternatively, it is envisaged that the input to the status acquisition circuit may be a signal taken from alternative devices. It may, for example, be a voltage taken from a point in a circuit to be monitored. It may be a direct or indirect measure of a battery voltage, for example, of a supply battery associated with a relay or other device. In this case the status acquisition apparatus would monitor the battery voltage.

The input signal to the status acquisition apparatus will typically comprise a DC voltage. Alternatively, it may comprise an alternating voltage. In the latter case, the conversion means may be associated with a rectifier that converts the alternating voltage to a DC voltage signal prior to inputting it to the conversion means. In both cases, the mark-space ratio of the pulse width modulated waveform will decrease with increasing voltage magnitude.

Preferably the apparatus includes means for providing a user-definable pre-set reference value to the comparison means. Thus, it is possible simply to adapt the apparatus to different input voltages by changing the reference value. No physical components need be changed, so the apparatus can be readily adapted to monitor the status of a wide range of devices by choosing the appropriate reference for the signal that is being monitored. This is conveniently achieved by storing the reference value in a memory, the memory being accessed by the comparison means to read the preset reference value. The memory may be an electronic memory such as static or dynamic random access memory.

The apparatus may further include an opto-isolator which is adapted to electrically isolate the input signal applied to the comparison means from the conversion means.

The apparatus may include means for generating an internal, low voltage supply from the battery supply connected to the input to the conversion means. This may include a voltage regulator and may provide a supply for the comparison means.

The conversion means may comprise timer circuit means adapted to output the pulse width modulated signal. The timer circuit means may include an a stable first timer/oscillator circuit which generates a periodic control signal, for example, a pulsed waveform, that provides a trigger for a mountable second timer/oscillator circuit to output the pulse width modulated signal.

The conversion means may further include, in electrical series, a switching means, a resistor and a capacitor the switching means being connected to receive the input signal, whereby when the switching means is closed, the capacitor charges at a rate dependent upon the magnitude of the input signal (and the component values), opening and closing of the switching means being controlled by the output of the second timer/oscillator circuit. A second switching means may be included that is connected across the capacitor, the capacitor discharging through the second switching means when it is closed and not discharging when the second switching means is open, thereby allowing the capacitor to be charged through the first switching means, opening and closing of the second switching means also being controlled by the output of the second timer/oscillator circuit. The two switching means operate in opposing sense, i.e., when one is open, the other is closed.

The capacitor may be provided with a monitoring means for outputting a measure of the charging voltage across the capacitor to the second timer/oscillator circuit, the second timer/oscillator circuit being provided with threshold means such that the status signal output of the second timer/oscillator is negated when the voltage across the capacitor reaches a threshold value.

The pulse-width modulated signal output of the second timer/oscillator circuit may provide an input to the opto-isolator whereby the isolator outputs a pulse width modulated output signal to the comparison means. The output of the opto-isolator will be asserted when the output of the second timer/oscillator circuit exceeds the isolating turn-on voltage, and be negated when it is below this.

The comparison means may include a counter, and means enabling the counter to be incremented by a clock signal in dependence on the state of the pulse width modulated signal. The count signal may be updated periodically, e.g., every millisecond.

Means may be provided for enabling the counter to be incremented by a clock signal only while the pulse width modulated signal is high. Alternatively, the counter may be incremented by a clock signal for the duration of each mark-space ratio pair of the pulse width modulated signal. In either case, means are provided to reset the counter to a start value, such as zero, at the end of every mark-space ratio pair, of the pulse width modulated signal.

The comparison means may be adapted to compare the pulse width modulated signal with the reference value by comparing an output of the counter at the end of a pulse of the pulse width modulated signal with the reference value. The comparison means may be adapted to produce the status indication signal if the output of the counter exceeds the reference value, such exceeding of the reference value being the predetermined criterion. This will indicate the pulse is too long and hence voltage at the input of the status acquisition apparatus is too low (i.e., mark-space ratio too high).

Alternatively, the comparison means may be adapted to compare the state of the pulse width modulated signal with an expected state when the output of the counter has reached a value determined by the reference value, said expected state being the predetermined criterion. For example, if the pulse has not finished once the count has reached a reference value, this may be used to indicate the voltage at the input of the status acquisition apparatus is too low.

In a further refinement, means may be provided for translating the output of the counter at the end of a pulse of the pulse width modulated signal into a digital word representative of the actual voltage at the input of the status acquisition apparatus.

It will be readily appreciated that by providing a different reference value, the apparatus can be easily adapted to different battery voltages. There is no need to change electrical component value, and the power dissipation can be optimized.

In accordance with a second aspect, the invention provides a protection and control system according to any preceding claim, in which the status acquisition apparatus is part of a protective switching device whose status is being monitored.

The protective switching device may be housed within a non-ventilated enclosure.

The output from the status acquisition apparatus may be fed to an indicator such as a bulb or perhaps to a microprocessor. It may be fed by a microprocessor together with the output of other status acquisition apparatus for subsequent processing.

The battery may have a nominal voltage of substantially more than 24 volts or less that 250 volts and an absolute voltage of substantially more than 16.2 volts or less that 300 volts

BRIEF DESCRIPTION OF THE DRAWINGS

There will now be described, by way of example only, one embodiment of the present invention with reference to the accompanying drawings of which.

DETAILED DESCRIPTION OF THE PREFERRED EMBODIMENTS

Figure 1:
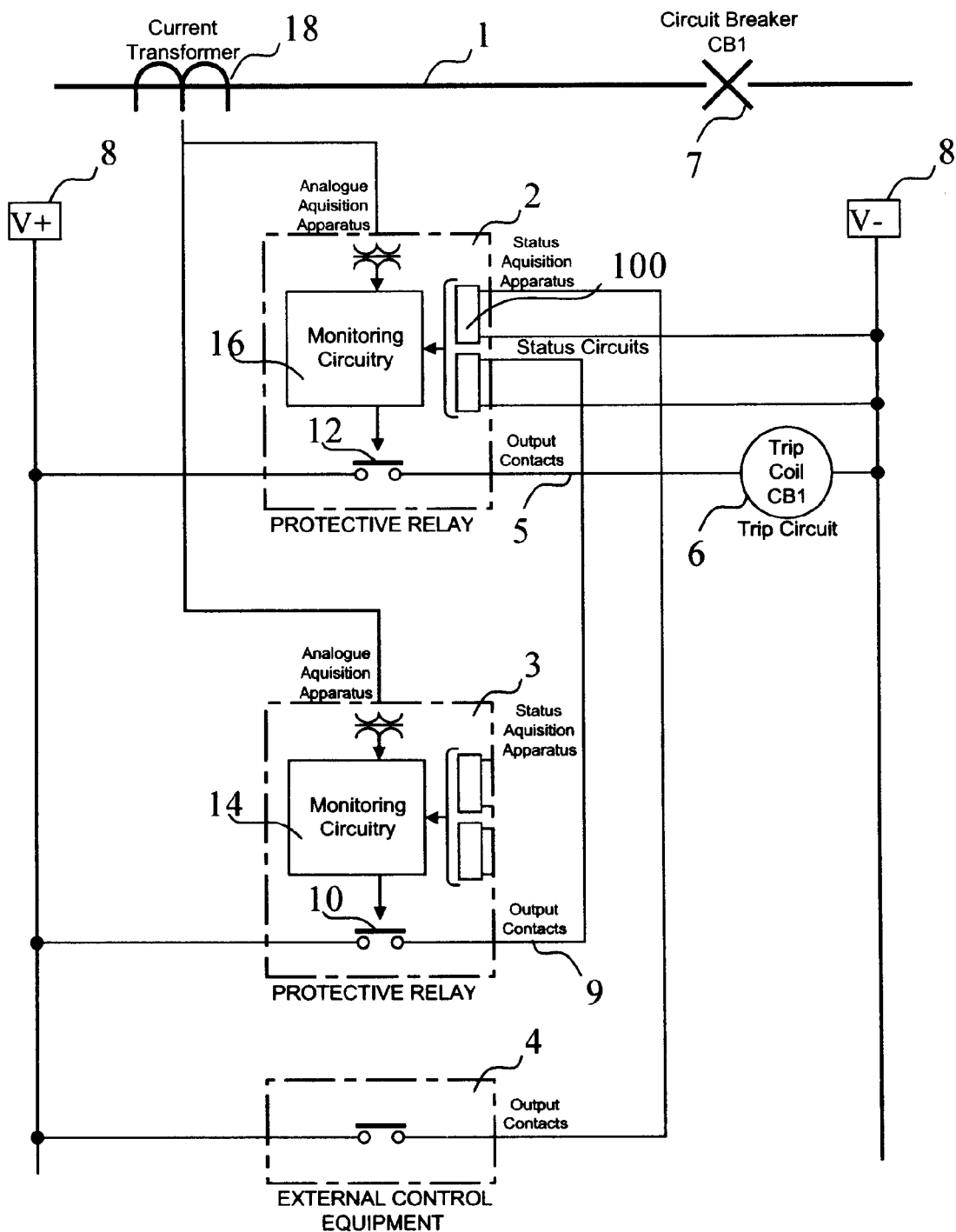
FIG. 1 illustrates a protection scheme including a protection relay with a status acquisition apparatus in accordance with the present invention.

As illustrated in FIG. 1 of the accompanying drawings, a typical protection scheme for protecting a section of line 1 or piece of equipment comprises of a number of protection relays 2,3 and other pieces 4 of external monitoring and control equipment. One or more circuit breakers will be placed in series with the item to be protected to control the current flow. Hence, as shown, the operation of a circuit breaker(s) is controlled by output 5 from the first protection relay 2 to a trip circuit 6.

The protection scheme will generally be powered from a battery supply 8 to provide maximum security of the supply.

Typically, as illustrated in FIG. 1, a status acquisition apparatus 100 is used when one protective relay 3 (or any other external apparatus 4) is required to modify the operation of another protective relay 2 instead of directly tripping a circuit breaker. In the illustrated embodiment, the output 9 from the contacts 10 of one of the protective relays 3 is used to switch an auxiliary battery supply onto the status acquisition apparatus 100 of the other protective relay 2. The protective relay 2 can then use this additional information in conjunction with data obtained from its own monitoring circuitry 16, to determine what action to take. Output contacts 12 of the protective relay 2 may then be used to operate visible or audible warning devices (not shown), and/or initiate a trip of the breaker. If the device has remote communications facilities, then the signal may be passed along a communications line to a central monitoring station.

Figure 2:
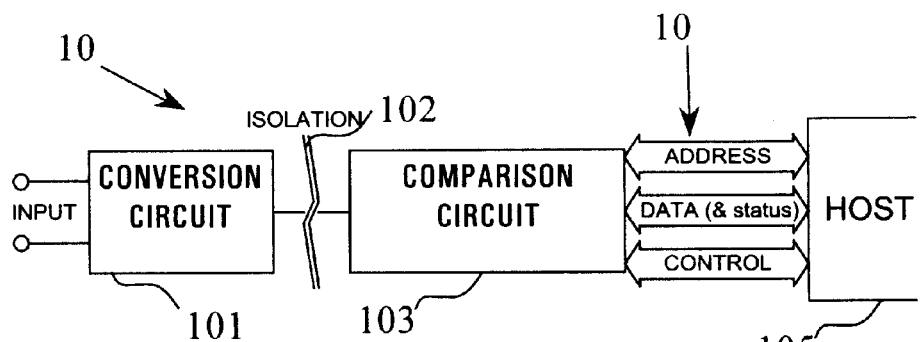
FIG. 2 is a schematic illustration of the main elements of the status acquisition apparatus.

The status acquisition apparatus 100 is illustrated schematically in FIG. 2 of the accompanying drawings.

The status acquisition apparatus 100 comprises two main circuits. Firstly, an input signal (in this case, the DC voltage from the battery or the status output of the second relay 3) is fed to an input or conversion circuit 101. As shown, this is via a direct connection to the battery, but it could be fed through a bridge rectifier to allow status acquisition using AC voltages. The conversion circuit 101 incorporates means to generate a pulse-width modulated signal in which the pulse-width is dependent upon the magnitude of the signal input to the conversion circuit 101.

The pulse width modulated signal is then passed through an opto-isolator 102 to a measurement or comparison circuit 103 which generates a status indication output signal 104 dependent upon the pulse width of the output of the opto-isolator. In the embodiment shown, the status output is high where the voltage present at its input is above a defined threshold, and low where no voltage or a voltage less than the threshold is present. This status signal 104 will then be converted into appropriate signals that can be read by the relay's host microprocessor 105 through the bus interface. It is envisaged that other forms of digital output may be produced.

Figure 3:
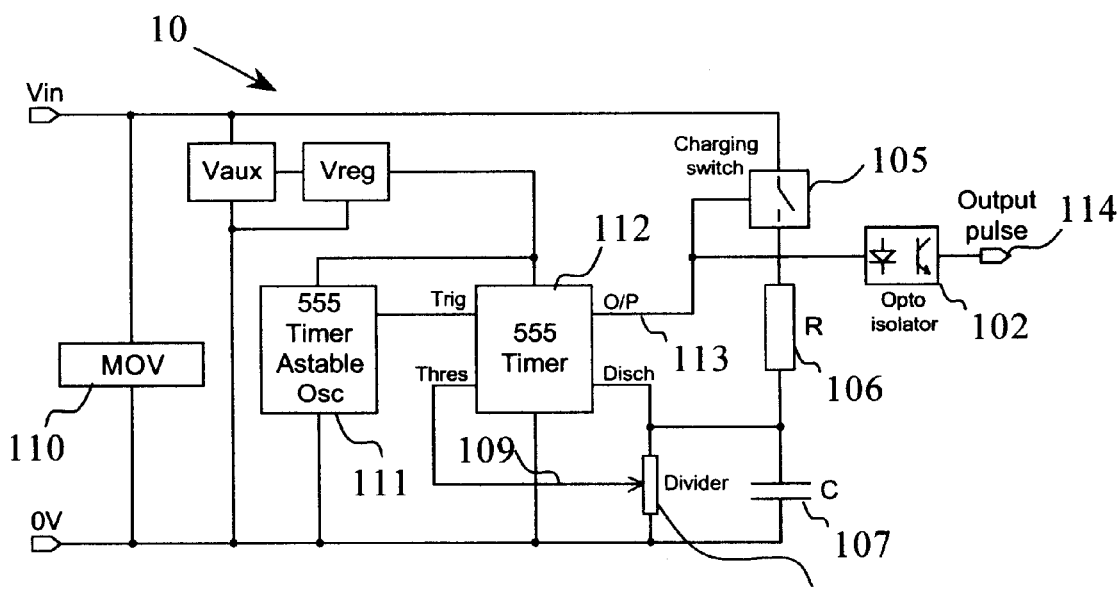
FIG. 3 is an illustration of the circuit elements that make up the conversion circuit of the status acquisition apparatus.

The conversion circuit 101 is illustrated in more detail in FIG. 3 of the accompanying drawings and consists of two timer/oscillator circuits 111, 112, both being 555 timer integrated circuits, the first of which is configured as an astable oscillator. This produces a pulsed output waveform of fixed frequency and duty cycle. The pulsed waveform provides a trigger signal for the second timer circuit 112, enabling the second timer circuit 112 to produce the pulse width modulated signal from the input voltage applied to the input circuit.

Meanwhile, the output 113 of the second timer circuit 112 is connected to a constant current source consisting of an N-channel FET and a sensing resistor(not shown). The constant current source is used to drive the base of a switching transistor 105. One side (the emitter) of the transistor 105 is connected directly to the input voltage Vin while the other is connected via a resistor 106 to one side of a capacitor 107. The other side of the capacitor 107 is connected to the common earth point or ground of the conversion circuit 101.

When the input waveform applied to the trigger input of the second timer circuit 112 switches from low to high, the transistor is switched on which allows current to flow from the input to charge the capacitor 107. The resistor 106, connected in series with the capacitor 107 and the transistor 105, limits the rate at which charge builds up onto the capacitor.

While the transistor remains turned on (i.e., the output of the first timer circuit 111 remains high) the capacitor 107 will continue to charge. The rate at which it charges is dependent upon the magnitude of the input voltage signal.

A voltage divider 108 is connected across the capacitor 107 and a proportion of the voltage across the capacitor 107 is fed from a tap 109 on divider 108 to the threshold input of the second timer circuit 112. Thus, as soon as the voltage across the capacitor 107 reaches a pre-determined threshold level, the output of the second timer circuit 112 will go low. This turns off the switching transistor 105 and at the same time, the capacitor is discharged by a transistor switch (not shown) which is integrated into the timer circuit 112. The switching transistor 105 remains off and the capacitor 107 remains discharged until the trigger input of the second timer circuit 112 receives a subsequent pulse from the first timer circuit 111.

The opto-isolator 102 is also connected to the output 113 of the second timer circuit 112. This opto-isolator 102 comprises a diode which illuminates a phototransistor when energized. As long as the switching transistor 105 is switched on, the opto-isolator 102 is energized. When the transistor 105 is switched off, the opto-isolator is de-energized. The output from the opto-isolator 102 comprises a digital pulse width modulated signal. The pulse width of the optoisolator output is dependent on the input voltage as a result of the operation of the conversion circuit.

The two timer circuits are powered by a voltage supply Vaux that is generated from the input voltage Vin. This is by way of an N channel FET that produces a roughly regulated output of nominally 10 volts. The rough voltage is fed to a series regulator to provide a smooth 5 volt supply Vreg. A rectifier diode ensures that the input to the whole circuit is polarized.

Overall protection for the circuit is provided by a metal oxide varistor (MOV) 110 connected across the input terminals.

The di-electric of the timing capacitor 107 which is repeatedly charged and discharged is selected to have a stable value over a range of temperatures which are compatible with the operational environment of the circuit. For example, a class 1 multi-layer ceramic capacitor with a COG (NPO) di-electric may be used. This type of capacitor is temperature compensating and in general does not have an ageing characteristic. The resistor value in series with the capacitor is chosen to allow adequate time for the timer circuit 112 to discharge the capacitor and for the circuit to settle at all expected input voltages.

Because the charging current to the capacitor 107 is switched off as soon as the threshold voltage is reached (by turning off the switching transistor 105) the power dissipated by the circuit is minimized.

In practice, the switching transistor 105 is comprised of an HV (high voltage) type transistor which is driven from the previously mentioned constant current source consisting of an HV N-channel FET and a sensing resistor driven from the output of the second 555 timer.

The opto-isolator provides isolation in excess of 2.5 kV rms between the conversion circuit and the comparison circuit. Obviously, this could be increased or lowered depending on the operational requirements and degree of protection needed.

Figure 4:
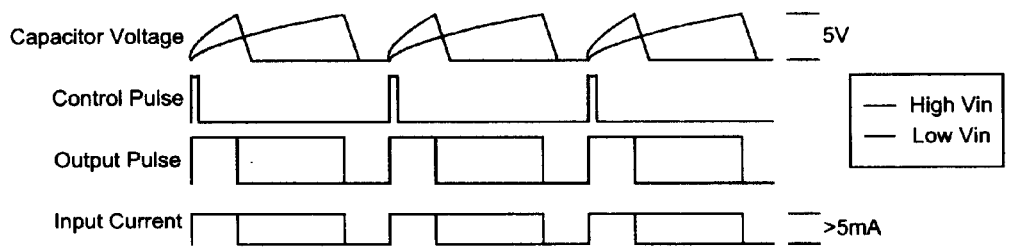
FIG. 4 is a graph showing the waveforms generated at various points of the conversion circuit when in use.

The output 114 of the input circuit 101 is an encoding of the input voltage Vin, in the form of a digital pulse width modulated signal. This is fed to the measurement circuit 103(FIG. 2). The waveforms describing operation of the input circuit are shown in FIG. 4 of the accompanying drawings.

Figure 5:
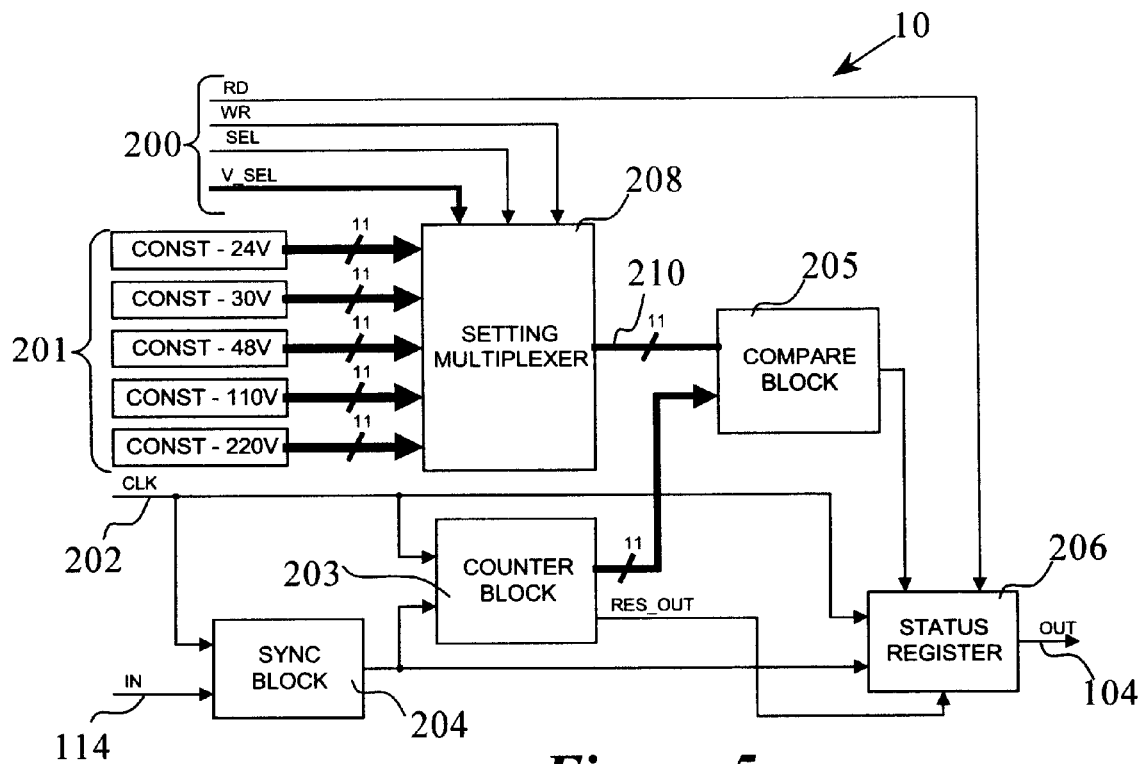
FIG. 5 is a schematic showing the various functional elements of the comparison circuit of the status acquisition apparatus.

As schematically shown in the block diagram of FIG. 5, the measurement circuit 103 is implemented in hardware using programmable logic. Each comparison circuit 103 needs an input 114 to receive the modulated signal from the input circuit 101 and an output 104 to provide the status signal. Control inputs 200 are provided for selection of one of a set of preset reference (comparison) constants 201 and a clock signal 202 is also provided to drive a counter 203. One likely use of the status acquisition apparatus would be as part of a microprocessor based protective relay in a power system and, in this case, the measurement circuit would be connected to the microprocessor bus via a bus interface circuit.

The comparison circuit 103 comprises a counter 203 that is triggered through clock synchronization circuit 204 when the waveform 114 from the input circuit 101 is asserted, i.e., goes high; this is a mark, rather than a space. The counter 203 then increases for as long as the pulse remains asserted. It is reset to zero and re-triggered on the arrival of the next pulse.

A comparator circuit 205 is provided which compares the value held in the counter 203 with the selected reference value 201. Five reference values have been implemented that can be selected by three of the control lines 200.

For example, in the case of a power system protective relay, the control lines 200 are driven by the microprocessor associated with the relay. This allows the appropriate setting to be selected through the user interface of the protective relay.

Figure 6:
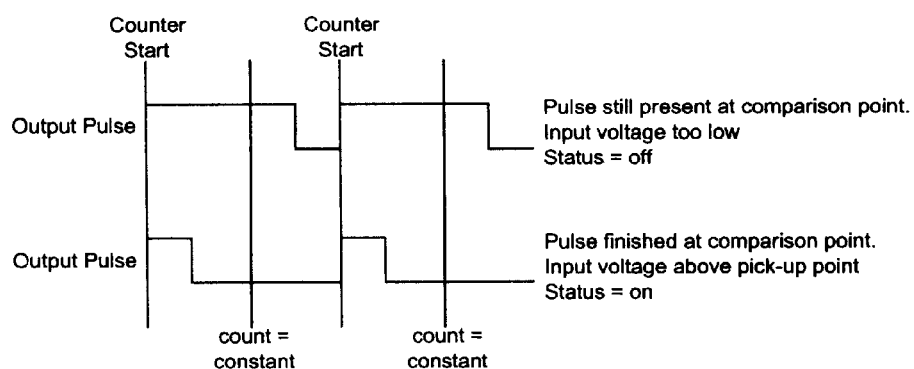
FIG. 6 is a graph showing output voltage waveforms within the comparison circuit and demonstrating the way in which the signal is processed to determine the voltage status.

Once the value output from the counter 203 has reached the pre-set reference value, a check signal is sent to a status register 206. The register then immediately measures the status of the pulse supplied from the input circuit. This is illustrated by the graphs in FIG. 6 of the accompanying drawings. The top graph shows that if the pulse waveform is still asserted when the comparison is made, then the output of the status register 206 is set to 'no signal' (Status=off). The bottom graph of FIG. 6 shows that if the pulse waveform is negated when the comparison is made, then the output of the status register 206 is set to 'valid signal' (Status=on).

In a modification, the counter 203 may instead continue to count until the pulse from the opto-isolator is negated. The counter value is then compared with the pre-set reference value to check the status of the input voltage and produce an appropriate output status. Alternatively, the counter value, when the pulse from the opto-isolator is negated, is recorded and translated into a digital word that represents the actual voltage on the input.

In practice, I have found that the status acquisition apparatus constituted as described is capable of measuring a wide voltage range (12–300 volts) at a current of more than 3 milliamps while maintaining a power dissipation of less than 0.2 watts. This is achieved because the input voltage is converted into a pulse waveform whose width decreases as the input voltage increases, the widths of the pulses being compared to fixed reference values to provide the apparatus with an on/off output status. Hence, the circuits are switched on for shorter periods at higher voltages, giving the desired reduced power dissipation.

It will be understood that each of the elements described above, or two or more together, also may find a useful application in other types of constructions differing from the types described above.

While the invention has been illustrated and described as embodied in an apparatus for monitoring the status of devices in electrical protection and control systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

I claim:

1. In a protection and control system for use in power generation, transmission and distribution, a status acquisition apparatus for monitoring a status of at least one device in the system, the apparatus comprising:

conversion means for receiving an input signal having a variable magnitude and representative of the status of the device and for converting the input signal into a pulse width modulated signal having a mark-space ratio which is inversely proportional to the magnitude of the input signal; and comparison means for comparing the mark-space ratio of the pulse width modulated signal with a reference value, and for producing a status indication signal in the event that a result of a comparison meets a predetermined criterion.

2. The apparatus according to claim 1, in which the input signal to the status acquisition apparatus comprises a DC voltage.

3. The apparatus according to claim 1, in which the input signal to the status acquisition apparatus comprises an alternating voltage, and in which the conversion means is associated with a rectifier that converts the alternating voltage to a DC voltage prior to inputting it to the conversion means.

4. The apparatus according to claim 1, including means for providing a user-definable pre-set reference value to the comparison means.

5. The apparatus according to claim 1, in which the reference value is stored in a memory, the memory being accessed by the comparison means.

6. The apparatus according to claim 1, including an opto-isolator which is adapted to electrically isolate the input signal applied to the comparison means from the conversion means.

7. The apparatus according to claim 1, including means for generating an internal, low voltage supply from an input to the conversion means.

8. The apparatus according to claim 1, in which the conversion means comprises timer circuit means for outputting the pulse width modulated signal.

9. The apparatus according to claim 8, in which the timer circuit means includes an astable first timer/oscillator circuit which generates a periodic control signal, that provides a trigger for a monostable second timer/oscillator circuit to output the pulse width modulated signal.

10. The apparatus according to claim 9, in which the conversion means further includes, in electrical series, a switching means, a resistor and a capacitor, the switching means being connected to receive the input signal, whereby when the switching means is closed, the capacitor charges at a rate dependent upon the magnitude of the input signal, opening and closing of the switching means being controlled by an output of the second timer/oscillator circuit.

11. The apparatus according to claim 10, in which the conversion means further includes a second switching means that is connected across the capacitor, the capacitor discharging through the second switching means when it is closed, and not discharging when the second switching means is open, thereby allowing the capacitor to be charged through the first switching, opening and closing of the second switching means also being controlled by the output of the second timer/oscillator circuit.

12. The apparatus according to claim 11, in which the capacitor is provided with a monitoring means for outputting a measure of the charging voltage across the capacitor to the second timer/oscillator circuit, the second timer/oscillator circuit being provided with threshold means such that the status signal output of the second timer/oscillator is negated when the voltage across the capacitor reaches a threshold value.

13. The apparatus according to claim 12, in which the pulse-width modulated signal output of the second timer/oscillator circuit provides an input to an opto-isolator, whereby the isolator outputs the pulse width modulated output signal to the comparison means.

14. The apparatus according to claim 1, in which the comparison means includes a counter, and means enabling the counter to be incremented by a clock signal in dependence on a state of the pulse width modulated signal.

15. The apparatus according to claim 14, including means enabling the counter to be incremented by the clock signal only while the pulse width modulated signal is high.

16. The apparatus according to claim 14, including means enabling the counter to be incremented by the clock signal for a duration of each mark-space ratio pair of the pulse width modulated signal.

17. The apparatus according to claim 15, including means for resetting the counter to a start value at an end of every mark-space ratio pair of the pulse width modulated signal.

18. The apparatus according to claim 15, in which the comparison means is adapted to compare the pulse width modulated signal with the reference value by comparing an output of the counter at an end of a pulse of the pulse width modulated signal with the reference value.

19. The apparatus according to claim 18, in which the comparison means is adapted to produce the status indication signal if an output of the counter exceeds the reference value, such exceeding of the reference value being the predetermined criterion.

20. The apparatus according to claim 18, in which the comparison means is adapted to compare a state of the pulse width modulated signal with an expected state when an output of the counter has reached a value determined by the reference value, said expected state being the predetermined criterion.

21. The apparatus according to claim 15, including means for translating an output of the counter at an end of a pulse of the pulse width modulated signal into a digital word representative of an actual voltage at an input of the status acquisition apparatus.

22. The apparatus according to claim 1, in which the status acquisition apparatus is part of a protective switching device whose status is being monitored.

23. In a protection and control system for use in power generation, transmission and distribution, a status acquisition apparatus for monitoring a status of a protective relay in the system, the apparatus comprising:

conversion means for receiving an input voltage representative of the status of the device and for converting the input voltage into a pulse width modulated signal having a mark-space ratio which decreases as the input voltage increases to maintain power dissipation below a predetermined power; and comparison means for comparing the mark-space ratio of the pulse width modulated signal with a reference value, and for producing a status indication signal in the event that a result of a comparison meets a predetermined criterion.

* * * * *